US010947387B2

(12) United States Patent
Alvarado et al.

(10) Patent No.: US 10,947,387 B2
(45) Date of Patent: Mar. 16, 2021

(54) LIGNIN-CONTAINING SEALANT AND/OR COATING COMPOSITIONS FROM RENEWABLE SOURCES

(71) Applicant: RISE Innventia AB, Stockholm (SE)

(72) Inventors: Fernando Alvarado, Stockholm (SE); Göran Flodberg, Lidingö (SE)

(73) Assignee: RISE INNVENTIA AB, Stockholm (SE)

( * ) Notice: Subject to any disclaimer, the term of this patent is extended or adjusted under 35 U.S.C. 154(b) by 193 days.

(21) Appl. No.: 16/096,012

(22) PCT Filed: Mar. 17, 2017

(86) PCT No.: PCT/SE2017/050261
§ 371 (c)(1),
(2) Date: Oct. 24, 2018

(87) PCT Pub. No.: WO2017/188874
PCT Pub. Date: Nov. 2, 2017

(65) Prior Publication Data
US 2019/0136062 A1    May 9, 2019

(30) Foreign Application Priority Data
Apr. 29, 2016  (SE) .................................... 1650576-0

(51) Int. Cl.
*C08L 97/00*    (2006.01)
*C09D 5/34*    (2006.01)
(Continued)

(52) U.S. Cl.
CPC .............. *C08L 97/005* (2013.01); *C09D 5/34* (2013.01); *C09D 133/04* (2013.01);
(Continued)

(58) Field of Classification Search
None
See application file for complete search history.

(56) References Cited

U.S. PATENT DOCUMENTS 4,374,738 A  *  2/1983  Kelley .................... C09K 8/24
507/108
4,871,825 A     10/1989  Lin
(Continued)

FOREIGN PATENT DOCUMENTS

CN    102140289 A  *  8/2011
CN    102140289 A     8/2011
(Continued)

OTHER PUBLICATIONS

CN-102533019-A—English translation (Year: 2012).*
(Continued)

*Primary Examiner* — Stefanie J Cohen
(74) *Attorney, Agent, or Firm* — Pearne & Gordon LLP

(57) ABSTRACT

The present invention relates to lignin-containing compositions comprising: 0 to 50 percent by weight of lignin; 0 to 50 percent by weight of a liquid C2-C4polyol; and 10 to 50 percent by weight of an acrylic resin; wherein the percentages by weight are expressed relative to the total dry weight of the composition, and wherein the total dry weight of the composition amounts to 100 percent. The present invention further relates to processes for sealing joints or coating surfaces using such a composition. Moreover, the present invention relates to joints sealed and surfaces coated using such a composition, as well as vehicles comprising such sealed joints and coated surfaces.

17 Claims, 1 Drawing Sheet

(51) Int. Cl.
*C09D 133/06* (2006.01)
*C09D 197/00* (2006.01)
*C09D 133/04* (2006.01)
C09J 133/06 (2006.01)
C09J 197/00 (2006.01)

(52) U.S. Cl.
CPC ....... *C09D 133/06* (2013.01); *C09D 197/005* (2013.01); *C09J 133/06* (2013.01); *C09J 197/00* (2013.01); *C09J 197/005* (2013.01)

(56) References Cited

U.S. PATENT DOCUMENTS

| 2007/0044406 A1 | 3/2007 | Van Aken et al. |
| 2015/0197667 A1 | 7/2015 | Bowman et al. |

FOREIGN PATENT DOCUMENTS

| CN | 102140293 | A | * | 8/2011 |
| CN | 102140293 | A |   | 8/2011 |
| CN | 102533019 | A | * | 7/2012 |
| CN | 102533019 | A |   | 7/2012 |
| CN | 102888159 | A | * | 1/2013 |
| CN | 103031108 |   |   | 4/2013 |
| CN | 104341922 | A |   | 2/2015 |
| CN | 104694006 | A |   | 6/2015 |
| CN | 104804911 | A |   | 7/2015 |
| DE | 4437720   | A1 |  | 4/1996 |
| WO | 2014095800 | A1 |  | 6/2014 |
| WO | 2015054736 | A1 |  | 4/2015 |
| WO | 2017188874 | A1 |  | 11/2017 |

OTHER PUBLICATIONS

CN-102140293-A—English translation (Year: 2010).*
CN-102140289-A—English translation (Year: 2010).*
CN-102888159-A—English translation (Year: 2011).*
International Search Report issued in application No. PCT/SE2017/050261 dated May 22, 2017, 5 pages.
Written Opinion issued in application No. PCT/SE2017/050261 dated May 22, 2017, 7 pages.
Office action for Swedish application No. 1650576-0 dated Oct. 31, 2016, 6 pages.
First Office Action with English Translation for Chinese Application No. 2017800257915 dated Feb. 27, 2020.
Second Office Action with English Translation for Chinese Application No. 2017800257915 dated Oct. 13, 2020.
Search Report for Chinese Application No. 2017800257915 dated Feb. 18, 2020.
Zhou, et al., "Polymer Material Molding Process", China Light Industry Press, p. 92, May 31, 2000 (cited as D2 in First Chinese Office action; concise explanation of relevance included).
Yao, et al, "Guidelines on Application of Pharmaceutical Adjuncts", China Pharmaceutical Science and Technology Press, p. 44, Aug. 31, 2011 (cited as D3 in first Chinese Office action; concise explanation of relevance included).
Zhai, "Application Manual for Building Adhesives and Waterproofing Materials", China Petrochemical Press, pp. 15-16, Jun. 30, 2000 (cited as D4 in first Chinese Office action; concise explanation of relevance included).
Wang, et al., "Novel Building Materials", 1st Edition, China Building Industry Press, pp. 200-201, Jul. 31, 2003 (cited as D5 in second Chinese Office action; concise explanation of relevance included).
Li, "Adhesion Theory, Technology and Application", 1st Edition, South China University of Technology Press, pp. 55-56 (cited as D6 in second Chinese Office action; concise explanation of relevance included).
Search Report for European Patent Application No. 17790007.3 dated Dec. 3, 2019.
XP-002795958, File Caplus; C:\EPODATA\eplogf\EP17790007. log; Nov. 21, 2019, pp. 1-2.
XP-002795959, File Caplus; C:\EPODATA\eplogf\EP17790007. log; Nov. 21, 2019, pp. 1-2.

* cited by examiner

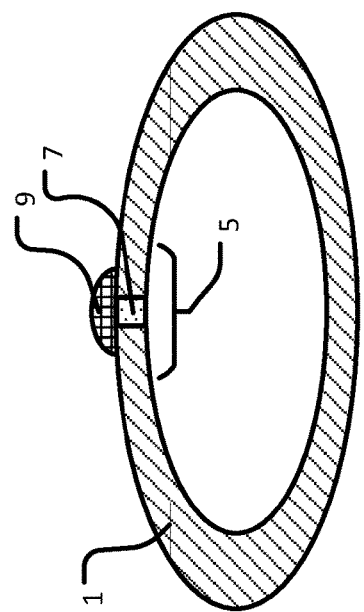
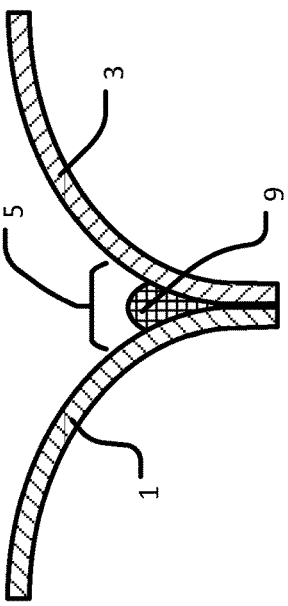
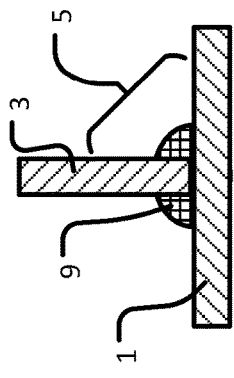
Fig. 1d  Fig. 1e  Fig. 1f
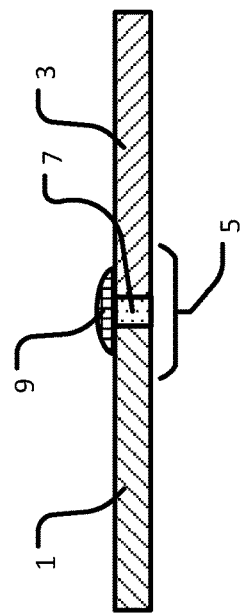
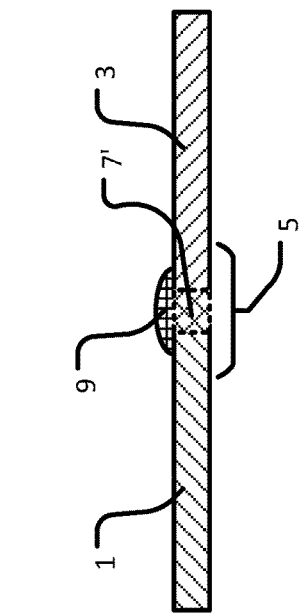
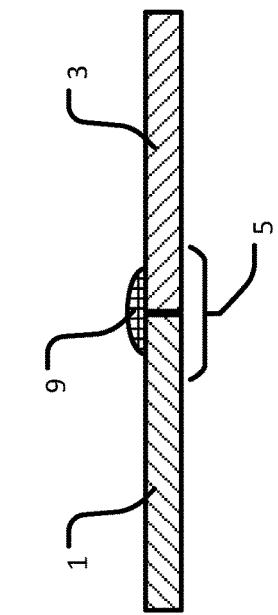
Fig. 1a  Fig. 1b  Fig. 1c

LIGNIN-CONTAINING SEALANT AND/OR COATING COMPOSITIONS FROM RENEWABLE SOURCES

TECHNICAL FIELD

The present application relates to compositions for use as joint sealants and/or underbody coatings in automotive applications. The present application further relates to processes for producing sealed joints and/or coated surfaces. Moreover, the present application relates to sealed joints and coated surfaces produced by such processes, as well as vehicles comprising such sealed joints and coated surfaces.

BACKGROUND ART

The underbodies of vehicles are subject to stone chipping and water spray during use, leading to corrosion and ultimately mechanical degradation of the underbody structure. In order to protect a vehicle's underbody it is commonly coated with a special material known as an underbody sealant (or underbody coating), either in conjunction with manufacturing or post-sale servicing. The underbody sealant protects the underbody from chipping and abrasion, prevents moisture from corroding the underbody, lessens vibrations and dampens noise.

Similar materials are used for sealing joints and seams in the car body. These joint sealants are used for example in door folds and joints, roof tops and other parts of the body. The purpose of these sealants is to protect joints and seams from corrosion, to provide rigidity and to improve sound insulation.

Typically, approximately 4 kg of joint sealants and approximately 6 kg of underbody coating are used in the manufacture of a modern passenger car. The materials used as joint sealants and underbody coating typically contain PVC plastisols. These are suspensions of PVC particles in a liquid plasticizer. The liquid plasticiser is commonly a phthalate.

PVC is subject to environmental and health concerns. For example, it is derived from a fossil petrochemical feedstock and releases toxic dioxins and hydrochloric acid upon incineration. Likewise, a number of phthalate plasticisers commonly used in PVC plastisols are considered detrimental to health and are subject to increasing regulation. Since the phalate plasticisers are not covalently bound to the PVC polymer they are especially prone to leaching and environmental accumulation. Due to these environmental and health concerns, there is a general trend away from the use of PVC plastisols and a widespread desire to find suitable alternatives.

Lignin is a renewable biopolymer derived from lignocellulose sources such as wood. Pure lignin is obtainable for example as a by-product from paper manufacturing, and a number of pulp mills have recently begun isolating lignin on an industrial scale.

Lignin has previously been investigated as a component in coating compositions.

In document WO 2014/095800 coating compositions comprising lignin, a solvent and a crosslinker are disclosed. In some embodiments the crosslinker is a polymeric epoxy crosslinker comprising glycidyl (meth)acrylate. The coating is intended for application on food packaging, such as food cans.

There remains a need for coating and/or sealing compositions that address the known deficiencies of prior art materials such as PVC plastisol-based coatings and sealants.

SUMMARY OF THE INVENTION

There remains a need for coating and/or sealant compositions for automobile applications that are less detrimental to health and the environment, and that are to a large extent derived from renewable resources.

The object of the present invention is to a provide coating/sealant compositions derived to a large extent from renewable resources and that are non-detrimental to health and the environment.

This object is fulfilled by a lignin-containing composition according to the appended claims. The lignin-containing composition comprises:
  10 to 50 percent by weight of lignin;
  10 to 50 percent by weight of a liquid C2-C4 polyol; and
  10 to 50 percent by weight of an acrylic resin;
  wherein the percentages by weight are expressed relative to the total dry weight of the composition, and wherein the total dry weight of the composition amounts to 100 percent.

Such lignin-containing compositions comprise to a substantial extent a component from renewable sources, i.e. lignin. The use of PVC and phthalates is avoided, thus alleviating to a significant extent the environmental and health problems associated with the known prior art PVC plastisol materials.

Moreover, the compositions can be cured at lower temperatures and for shorter times as compared to known PVC plastisol-based alternatives. After curing, the compositions have excellent adhesion to common substrates including glass, plastic and especially metal. The cured compositions tolerate temperatures of at least 165° C., thus allowing for subsequent high-temperature production steps to be performed on the coated substrate. The cured compositions have excellent mechanical integrity and thus can prevent chipping of the substrate, and they provide an effective barrier to water and moisture. They have excellent vibrational dampening and sound-dampening properties.

The lignin-containing composition may comprise no solvent, i.e. the composition is solvent free or essentially solvent free. At least 90 percent of the total weight of the lignin-containing composition may consist of lignin, liquid C2-C4 polyol, acrylic resin and optionally a filler. Thus, no solvents are necessary in the production and application of the composition, therefore providing yet another environmental advantage.

The lignin-containing composition may comprise a non-aqueous protic or polar aprotic solvent, more preferably a solvent selected from methanol, ethanol, isopropanol, acetone and mixtures thereof. The lignin-containing composition may comprise 50 to 500 percent by weight of the solvent, relative to the total dry weight of the composition, wherein the total dry weight of the composition amounts to 100 percent. Thus, the composition may be thinned and the rheological properties adapted to be suitable for a wide range of applications.

The lignin-containing composition may further comprise 1 to 50 percent by weight of a filler selected from wood flour or a solid polyol, such as glucose, erythritol, lactitol, maltitol, mannitol, sorbitol, xylitol, pentaerythritol and their corresponding sugar pentoses and hexoses. Thus, a composition with an even greater proportion of materials from renewable sources can be obtained. The filler may preferably be wood flour. Wood flour, besides being derived from a renewable resource, affords the composition improved vibration- and sound dampening properties. Moreover, the use of wood flour provides a composition that is much less dense than comparable products using conventional fillers, thus leading to considerable weight savings when coating, for example, the underbody of a vehicle.

The lignin of the lignin-containing composition may be selected from kraft lignin, LignoBoost lignin, sulphite lignin, soda lignin, organosols lignin, lignin from cellulosic ethanol production, and mixtures thereof. Thus, the lignin can be obtained as a by-product of a paper pulping process, optimizing the use of the renewable lignocellulosic source materials. The lignin may preferably be LignoBoost lignin, since LignoBoost lignin is a high-quality, relatively pure lignin that is already produced on an industrial scale. The lignin may be a non-derivatised lignin, meaning that the lignin can be used as isolated, without the need for further derivatisation steps in order to make it compatible with the synthetic acrylic resin component.

The liquid C2-C4 polyol of the lignin-containing composition may be selected from ethylene glycol, propylene glycol, 1,3-butanediol, 1,4-butanediol, glycerol, or combinations thereof. These liquid polyols provide a sealing and/or coating composition with the desired properties. The C2-C4 liquid polyol may preferably be ethylene glycol or glycerol. The C2-C4 liquid polyol may even more preferably be glycerol. This means that yet another component derived from a renewable resource may be used in the lignin-containing composition.

The acrylic resin of the lignin-containing composition may comprise a monomer selected from methyl acrylate, ethyl acrylate, butyl acrylate, 2-chloroethyl vinyl ether, 2-ethylhexyl acrylate, trimethylolpropane triacrylate, acrylonitrile, methacrylates such as butyl methacrylate or hydroxyethyl methacrylate, or combinations thereof. An acrylic resin comprised of these monomers provides a lignin-containing composition with the desired properties.

According to another aspect, a sealant and/or coating composition comprising/consisting of the composition described above is provided.

According to a further aspect of the present invention, a process for forming a sealed joint is provided. The process comprises the steps of:
i. providing a joint, wherein the joint comprises an area where two substrates are mechanically or adhesively joined, and/or said joint comprises an area where one substrate abuts another substrate, wherein each of said substrates is independently selected from metal, plastic, glass, wood, stone, clay or ceramic;
ii. applying a composition according to any one of claims 1-11 to said joint and heating the applied composition at a predetermined temperature for a predetermined time.

In this manner, a joint is sealed using a material that is renewable, environmentally friendly and less detrimental to health than current alternatives.

The predetermined temperature may be 100 to 120° C. This provides a temperature sufficient for curing without requiring excessive heating, thus saving energy expenditure. The predetermined time may be 10 to 50 minutes. This means that the elevated temperature is not required for elongated periods, thus again saving on the energy required for heating as compared to known compositions that cure at higher temperatures. The joint to be sealed may be between two metal substrates, and is preferably a welded metal joint. The inventive composition is especially suitable for adhesion to metal substrates.

According to a yet another aspect of the present invention, a process for forming a coated surface is provided. The process comprises the steps of applying a lignin-containing composition as defined above to a surface of a substrate and heating the applied composition at a predetermined temperature for a predetermined time, wherein the substrate is selected from metal, plastic, glass, wood, stone, clay or ceramic.

In this manner, a surface is coated using a material that is renewable, environmentally friendly and less detrimental to health than current alternatives.

The predetermined temperature may be 100 to 120° C. This provides a temperature sufficient for curing without requiring excessive heating, thus saving energy expenditure as compared to known compositions that cure at higher temperatures. The predetermined time may be 10 to 50 minutes. This means that the elevated temperature is not required for elongated periods, thus again saving on the energy required for heating.

The surface to be coated may be the surface of a metal substrate. The inventive composition is especially suitable for adhesion to metal substrates. The surface to be coated may preferably be the surface of a metal vehicle component. The inventive composition has a number of properties making it highly suitable for use in automotive applications. The surface to be coated is most preferably the underbody of a vehicle. The inventive composition is resistant to chipping, provides a moisture barrier to prevent corrosion, and is vibration- and sound-dampening. These properties make it highly suitable for coating the underbody of a vehicle.

According to yet a further aspect a sealed and/or coated substrate is provided, the coated substrate being produced by at least one of the processes described above.

According to yet a further aspect, a vehicle is provided, the vehicle comprising a coated surface and/or a sealed joint formed by at least one of the processes described above.

BRIEF DESCRIPTION OF THE DRAWINGS

FIG. 1 schematically illustrates a number of joints that may be sealed using the composition of the invention.

DETAILED DESCRIPTION

General Definitions

Ranges of values expressed as "X to Y" are to be interpreted as including the end point values. So, for example, a temperature of "100 to 120° C." encompasses 100° C., 120° C. and any value intermediate to 100° C. and 120° C., such as 110° C.

By renewable it is meant a material derived from a natural resource that, after exploitation, can return to its previous stock levels by natural processes of growth or replenishment.

Composition

The compositions of the present invention are primarily intended for use as joint sealants and/or underbody coatings in automotive applications. However, they may be used in any number of similar or related applications where a substrate, such as metal, must be coated to avoid chipping, abrasion, corrosion, or to dampen vibration or sound. The components of the composition are as follows:

Lignin

Lignin is an amorphous polyphenolic material created through the enzymatic polymerisation of coniferyl-, sinapyl- and p-coumaryl-alcohols in lignocellulosic materials such as wood. The lignin for use in the present invention may be obtained from any lignocellulosic source material. These include wood, annual crops and agricultural waste.

Suitable woods may include softwoods and hardwoods. The softwood tree species can be for example, but are not limited to: spruce, pine, fir, larch, cedar, and hemlock. Examples of hardwood species from which lignin suitable as a starting material in the present invention may be derived include, but are not limited to: birch, oak, poplar, beech, eucalyptus, acacia, maple, alder, aspen, gum trees and gmelina. The raw material for lignin production may comprise a mixture of different softwoods, e.g. pine and spruce. The raw material may also comprise a non-wood raw material, such as bamboo, sugar beet pulp, wheat straw, soy hulls, corn stover, bagasse and grasses such as switchgrass and elephant grass.

Since the lignin can be produced from various green resources, such as wood, agricultural residues and annual crops, it is thus abundant, renewable and biodegradable.

The lignin may be isolated as a by-product of a pulping process for the manufacture of paper or board. Common pulping processes are the kraft (sulphate) process, sulphite process, soda process and organosols processes that may utilize a variety of solvents including but not limited to ethanol, methanol, butanol, ethylene glycol, acetic acid, formic acid, acetone and mixtures thereof. The lignin may be obtained from a LignoBoost process whereby high-quality lignin is obtained by at least partially neutralising kraft black liquor using carbon dioxide in order to precipitate the lignin. The LignoBoost process is further described in: Tomani, Per; The Lignoboost Process; Cellulose Chem Technol., 44(1-3), 53-58 (2010).

The lignin may be isolated as a by-product of cellulosic ethanol production. When fermenting a lignocellulosic biomass feedstock to produce ethanol, typically 15 to 30 percent of the biomass remains unconverted after fermentation. This residual biomass comprises primarily lignin.

The lignin used in the present invention is preferably non derivatised lignin. By non-derivatised lignin it is meant lignin that is not subject to any extensive derivatisation either during isolation or through post-isolation modification. Non-derivatised lignins may be subject to some degree of hydrolysis or oxidation during isolation, depending on the process used for isolating the lignin, but this is an unintentional consequence of the isolation process and the primary lignin structure remains substantially intact and unmodified. For example, lignins isolated by the kraft and soda pulping processes are considered to be non-derivatised. Lignosulfonates isolated as a by-product of the sulphite pulping process are not considered to be a non-derivatised due to the abundance of sulfonate groups formed on the lignin primary structure. Ogranosolv lignins may or may not be considered non-derivatised depending on the extent of derivatisation (e.g. acetylation) occurring during isolation.

The lignins used may be fractionated by any means known in the art, e.g. ultrafiltration or precipitation, in order to provide a purer lignin or a lignin with reduced dispersity.

The lignin is preferably provided in pulverized form for use in the compositions of the invention.

Liquid C2-C4 Polyol

By liquid C2-C4 polyol it is meant a molecule that is liquid at a suitable processing temperature, such as 30° C., and having from two to four carbon atoms and two or more hydroxyl groups. The C2-C4 liquid polyol may be a diol or a triol. Suitable C2-C4 liquid polyols include ethylene glycol, propylene glycol, 1,3-butanediol, 1,4-butanediol and glycerol. Glycerol is the most preferred C2-C4 liquid polyol, due to it being obtainable from natural renewable sources.

Glycerol is also known as glycerine, glycerin, or to give it its IUPAC name, propane-1,2,3-triol. Natural glycerol may be obtained as a by-product of the base-catalysed transesterification of triglycerides to provide bio-diesels, such as rapeseed methyl ester (RME).

The glycerol may preferably be provided as a liquid for use in the compositions of the invention, more preferably as a substantially pure liquid, i.e. greater than 80% pure. However, crude glycerol, e.g. from biofuel synthesis, may also be used.

Acrylic Resin

By acrylic resin it is meant any of a group of polymers of acrylic acid, methacrylic acid, esters or amides thereof, or acrylonitrile. The acrylic resin used in the present invention may be a homopolymer or a copolymer, including, but not limited to biopolymers, terpolymers and quaterpolymers, such as random copolymers, alternating copolymers, periodic copolymers, statistical copolymers, block copolymers, graft copolymers, or core-shell copolymers. The acrylic resin may be neutral or it may be charged, i.e. having anionic or cationic groups incorporated.

Suitable monomers for inclusion in the acrylic resin include, but are not limited to, methyl acrylate, ethyl acrylate, butyl acrylate, 2-chloroethyl vinyl ether, 2-ethylhexyl acrylate, trimethylolpropane triacrylate, acrylonitrile, methacrylates such as butyl methacrylate or hydroxyethyl methacrylate, or combinations thereof.

The acrylic resin may preferably be provided in powdered form for inclusion in the composition of the invention.

Filler

The composition of the present invention may comprise a filler if desired. The filler may be any filler known in the art. However, it has been discovered that fillers derived from renewable resources, such as solid polyols or wood flour, make for suitable fillers with environmental benefits.

Solid polyols are polyols that are solid at the operating temperature of the composition, e.g. solid at greater than 50° C. A suitable polyol can be selected on the basis of its melting point depending on the operating temperature of the relevant application. Such polyols include, but are not limited to, glucose, erythritol, lactitol, maltitol, mannitol, sorbitol, xylitol, pentaerythritol and their corresponding sugar pentoses and hexoses.

Wood flour is finely pulverized wood. High-quality wood flour is typically obtained from hardwoods, although softwood wood flour may also be used. Examples of hardwood species from which wood dust may be derived include, but are not limited to: birch, oak, poplar, beech, eucalyptus, acacia, maple, alder, aspen, gum trees, gmelina, and mixtures thereof. The softwood tree species can be for example, but are not limited to: spruce, pine, fir, larch, cedar, hemlock, and mixtures thereof. The raw material for wood flour may comprise a mixture of different hardwoods and softwoods. Wood flour has a much lower density than the calcium carbonate filler commonly used in conjunction with PVC plastisol coatings, meaning that substantial weight savings can be made. Wood flour also has a vibrational dampening effect when incorporated into a coating composition, as well as a sound dampening effect. The wood flour may have a particulate size of about 20 mesh (US standard, 850 μm opening) to about 200 mesh (US standard, 74 μm opening).

The filler may preferably be provided in powdered form for inclusion in the composition of the invention.

Solvent

The composition according to the present invention may be solvent free and thus comprise no solvent. In this case, the lignin, glycerol acrylic resin, and any further additives are mixed to a viscous paste and applied to the appropriate substrate. By solvent free or no solvent whatsoever, it is meant that no volatile solvent is purposefully added to the composition. Residual amount of water or volatiles may be present in the various components of the composition.

In some applications the rheological properties of the composition must be modified by addition of a suitable solvent. Depending on the application this may be a protic or polar aprotic solvent. By protic solvent is meant a solvent capable of acting as a proton donor, commonly having a hydrogen atom bound to an oxygen atom or nitrogen atom. By polar aprotic solvent is meant a solvent having a relative permittivity over ca. 15, a significant permanent dipole moment and that cannot donate a suitably labile proton in solution, i.e. is at most weakly protogenic. The solvent may have a volatility suitably high so as to enable removal of the solvent by heating when curing the composition. Suitable non-aqueous protic and polar aprotic solvents include but are not limited to ethanol, methanol, isopropanol, acetone, and mixtures thereof.

By protic solvent is meant a solvent capable of acting as a proton donor, commonly having a hydrogen atom bound to an oxygen atom or nitrogen atom. By polar aprotic solvent is meant a solvent having a relative permittivity over ca. 15, a significant permanent dipole moment and that cannot donate a suitably labile proton in solution, i.e. is at most weakly protogenic.

Further Additives

The compositions of the invention may comprise further additives known in the art, including but not limited to dyes, pigments, stabilizers, antioxidants, curing initiators, flame retardants and corrosion inhibitors.

Relative Proportion of Components

The sealant/coating compositions of the present invention comprise/consist of:
  10 to 50 percent by weight of lignin;
  10 to 50 percent by weight of a liquid C2-C4 polyol;
  10 to 50 percent by weight of an acrylic resin.

The compositions may optionally further comprise/consist of 1 to 50 percent by weight of a filler. The filler may be used to adjust the properties of the composition such as rheology, density, sound-dampening, vibrational dampening, mechanical properties, etc.

The compositions may optionally further comprise/consist of up to 10 percent by weight of further additives in order to provide the compositions with specific properties, such as colour, sheen, flame retardancy, stability, etc.

Percentages by weight are expressed relative to the total dry weight of the composition, wherein the total dry weight of the composition amounts to 100 percent.

By total dry weight of the composition it is meant the combined dry weight of the lignin, C2-C4 liquid polyol, acrylic resin, filler and further additives.

The components of the composition are preferably present in approximately equal proportions, excluding any further additives.

So, for example, the sealant/coating composition of the present invention and having approximately equal proportions of components may comprise/consist of:
  20 to 40 percent by weight of lignin;
  20 to 40 percent by weight of a liquid C2-C4 polyol;
  20 to 40 percent by weight of an acrylic resin.

The above composition may optionally further comprise/consist of 1 to 30 percent by weight of a filler. The above composition may also optionally further comprise/consist of up to 10 percent by weight of further additives.

For example, the sealant/coating composition of the present invention may comprise/consist of:
  25 to 40 percent by weight of lignin;
  25 to 30 percent by weight of a liquid C2-C4 polyol;
  25 to 30 percent by weight of an acrylic resin.

The above composition may optionally further comprise/consist of 1 to 25 percent by weight of a filler.

For example, a composition comprising no filler and having approximately equal proportions of components may consist or essentially consist of:
  25 to 40 percent by weight of lignin;
  25 to 40 percent by weight of a liquid C2-C4 polyol; and
  25 to 40 percent by weight of an acrylic resin.

Such a composition may optionally further consist of up to 10 percent by weight of further additives.

Such a composition, comprising no filler, may be especially suitable as a sealant composition, such as for sealing welded metal joints in automotive applications.

For a composition comprising a filler, a suitable composition having approximately equal proportions of components may consist or essentially consist of:
  20 to 30 percent by weight of lignin;
  20 to 30 percent by weight of a liquid C2-C4 polyol;
  20 to 30 percent by weight of an acrylic resin; and
  20 to 30 percent by weight of a filler.

Such a composition may optionally further consist of up to 10 percent by weight of further additives.

Such a composition, comprising filler, may be especially suitable as a coating composition, such as for use as an underbody coating in automotive applications.

The composition may be used without a solvent, by mixing the individual components together to form a paste for application to the relevant substrate. However, some applications may advantageously require adjustment of the rheological properties of the composition by dispersion in a solvent. In such a case, the solvent may be added in amounts of 50 to 500 weight percent of the relative to the total dry weight of the composition, wherein the total dry weight of the composition amounts to 100 percent, i.e. 0.5 to 5 parts by weight of solvent may be added to one part dry composition.

Process and Applications

The composition is formed by mixing the lignin, liquid C2-C4 polyol, acrylic resin and any filler, further additives and/or solvents together to form a well-dispersed paste or viscous fluid. The components may be added or mixed in any order.

Once the sealant/coating composition is formed, it may be applied to a substrate by any method known in the art, including but not limited to spraying, brushing, and extrusion through a nozzle.

Suitable substrates include any substrate requiring a protective coating, or a sealing layer between joints. Such substrates include materials comprising plastics, glass, ceramics, wood, stone, clay, or metals. For example, sheet metal, clay tiles, bricks, construction panels and window panes are suitable substrates. Plastics is used in the generic sense to mean any polymer commonly used as a construction material in products, including both thermoplastic and thermosetting polymers. Composite materials, such as laminate flooring or concrete are suitable as the substrate. Metals are the most preferable substrates, especially the underbody of automobiles and/or any metal joints formed during automobile construction.

If used as a joint sealant, it may be advantageous to utilize a composition comprising little or no filler, whereas for use as an underbody coating, higher proportions of filler may be advantageous.

A joint can be sealed by a process comprising the steps of:
i. providing a joint;
ii. applying a composition as defined above to said joint and heating the applied composition at a predetermined temperature for a predetermined time.

A joint may comprise an area where two substrates are mechanically or adhesively joined, and/or an area where one substrate abuts another substrate.

A variety of joints that may be sealed are shown schematically in FIG. 1. The substrates 1,3 may be joined via an adhesive or solder (FIG. 1a), thereby providing a joint 5 with an interfacial adhesive or solder layer 7. The substrates may be mechanically joined by any known means, for example by welding (FIG. 1b) to provide a welded joint 5 having a welded metal area 7'. Other examples of mechanical joints are screw joints and bolted joints (not shown). A joint may also comprise an area where one substrate abuts another substrate, without the two substrates necessarily being directly physically joined. By abut, it is meant that the two substrates are in close physical proximity, but not necessarily touching. Such joints include, but are not limited to, edge-to-edge joints (FIG. 1c), edge-to-surface joints (FIG. 1d) and surface to surface joints (FIG. 1e). Two edges or surfaces of a single substrate may also be joined (FIG. 1f). For example, a tiled surface comprises edge-to-edge joints at each edge of each tile.

The composition 9 is applied to the joint 5 with a coverage sufficient to provide the desired sealing effect. Preferably the sealant is applied so that no gaps remain in the joint, thus preventing moisture, dirt or other undesirable substances from penetrating the joint.

The surface of a substrate can also be coated using the lignin-containing composition. In such a case, the composition is applied to the surface with a desired thickness. The composition may be applied directly to the surface of the substrate, or the substrate may be coated with one or more further layers, such a primer layers, prior to coating with the lignin-containing composition.

The composition may also be used as a filler or sealant for filling cracks or faults arising in a substrate, e.g. cracked concrete.

After application, the composition is cured, preferably by heating, although other methods of curing such as electron beam or UV-curing may potentially be used. The composition may comprise a curing additive in order to increase the curing rate or improve the curing process.

Typically, curing is performed by heating at a temperature of at least 100° C., such as 100 to 120° C. This is lower than the typical curing temperature of PVC-based materials, which typically is about 160° C. The time required for curing may vary depending on the exact composition, but is typically in the range of 10 to 50 minutes. Again, this is shorter than for comparable PVC based materials, which typically require about an hour to cure.

After curing, a uniform, material with a smooth surface is obtained. The material has excellent mechanical properties and strong adhesion to a wide range of substrates, including metal. It is stable at temperatures of at least 165° C., meaning that it can tolerate exposure to temperatures commonly occurring during subsequent application and curing of a vehicle's paintwork. No leaching of components, such as liquid C2-C4 polyols, from the material can be observed.

Without wishing to be bound by theory, it is hypothesised that the C2-C4 liquid polyol partakes in a chemical reaction together with the lignin and acrylate resin, leading to a covalently bound composition. It is believed that this chemical reaction is the root of the excellent mechanical properties of the composition, and the reason why no leaching of the liquid C2-C4 polyol can be detected.

The invention has been described in conjunction with use in automotive applications, such as for sealing metal joints and/or for underbody coating. However, any other applications where a substantially rigid substrate is in need of a protective coating, or where joints are in need of sealing, are conceivable. Such applications include coatings for industrial robots, offshore rigs and metal infrastructure such as bridges, or as sealants for tiled surfaces, glazing panels, construction panels, etc.

Advantages

The present invention provides coating/sealant compositions that comprise to a substantial extent components from renewable sources, i.e. lignin, glycerol, wood flour, sugar polyols. The compositions alleviate to a significant extent the environmental and health problems associated with the known prior art PVC plastisol materials, that comprising phthalate plasticizers. The compositions can be cured at lower temperatures and for shorter curing times as compared to PVC-based materials. After curing, the compositions have excellent adhesion to common substrates including glass, plastic, stone, clay, ceramic and especially metal. They tolerate temperatures of at least 165° C., thus allowing subsequent high-temperature production steps to be performed on the coated substrate. They have excellent mechanical integrity and thus can prevent chipping of the substrate, and they provide an effective barrier to water and moisture. They have excellent vibrational dampening and sound-dampening properties, which can be further improved by judicious choice of filler. Furthermore, by using wood flour as filler substantial weight savings can be made as compared to traditional calcium carbonate filled PVC plastisol materials.

EXAMPLES

The following examples are provided to illustrate possible compositions according to the invention, and are in no way intended to limit the scope of the invention, as defined in the appended claims.

LignoBoost lignin was obtained from LignoBoost Demo AB, Backhammar, Sweden.

Example 1

Inventive

Lignin+acrylate+glycerol (40:30:30): The compounds are mixed to a paste and applied with a spatula (50×10×3 mm) to a plate steel. The composition was cured at 105° C. for 30 minutes. The composition appeared homogenous and no leaching of any compounds could be observed. The composition displayed excellent adhesion to plate steel, was able to resist chipping by hand using a spatula and was stable up to at least 165° C.

Example 2

Inventive

Lignin+acrylate+ethylene glycol (40:30:30): The compounds are mixed to a paste and applied with a spatula (50×10×3 mm) to a plate steel. The composition was cured at 105° C. for 30 minutes. The composition appeared homogenous and no leaching of any compounds could be observed. The composition displayed excellent adhesion to plate steel, was able to resist chipping by hand using a spatula and was stable up to at least 165° C.

Example 3

Inventive

Lignin+acrylate+glycerol+wood flour 20 mesh (25:25:25:25): The compounds are mixed to a paste and applied with a spatula (50×10×3 mm) to a plate steel. The composition was cured at 105° C. for 30 minutes. A rubber-like composition appeared homogenous and no leaching of any compounds could be observed. The composition displayed excellent adhesion to plate steel, was able to resist chipping by hand using a spatula and was stable up to at least 165° C. This composition is suitable for underbody coating.

Example 4

Inventive

Compositions comprising a solid polyol as the filler were produced by the method of Example 3, wherein wood flour was replaced by mannitol, sorbitol or glucose (25 lignin:25 acrylate:25 glycerol:25 solid polyol). The compositions produced each displayed excellent adhesion to plate steel, were able to resist chipping by hand using a spatula and were stable up to at least 165° C. without leaching of any compounds.

Example 5

Comparative

Lignin+acrylate+Polyethylene glycol (PEG 400-1200), (40:30:30): The compounds are mixed to a paste and applied with a spatula (50×10×3 mm) to a plate steel. The composition was cured at 105° C. for 30 minutes. The composition obtained appeared homogenous and no leaching of any compounds could be observed. The composition displayed excellent adhesion to plate steel, was able to resist chipping by hand using a spatula, but however was not stable at 165° C. Some leaching compounds of PEG, principally from PEG 400, could be observed causing some irregularities on the surface of the composition.

Example 6

Comparative

Lignin+acrylate+phthalate (40:30:30): The compounds are mixed to a paste and applied with a spatula (50×10×3 mm) to a plate steel. The composition was cured at 105° C. for 30 minutes. The rubber-like composition obtained appeared homogenous. and no apparent leaching of any compounds could be observed. The composition displayed excellent adhesion to plate steel, was able to resist chipping by hand using a spatula and was stable up to at least 165° C.

The invention claimed is:

1. A lignin-containing composition comprising:
   10 to 50 percent by weight of lignin;
   10 to 50 percent by weight of a liquid C2-C4 polyol; and
   10 to 50 percent by weight of an acrylic resin;
   wherein the percentages by weight are expressed relative to the total dry weight of the composition,
   wherein at least 90 percent of the total dry weight of the composition consists of lignin, liquid C2-C4 polyol, acrylic resin and optionally a filler, and
   wherein the total dry weight of the composition amounts to 100 percent.

2. The lignin-containing composition according to claim 1, wherein the composition is solvent free.

3. The lignin-containing composition according to claim 1, further comprising a non-aqueous protic or polar aprotic solvent.

4. The lignin-containing composition according to claim 3, comprising 50 to 500 percent by weight of the solvent, relative to the total dry weight of the composition, wherein the total dry weight of the composition amounts to 100 percent.

5. The lignin-containing composition according to claim 1, further comprising 1 to 50 percent by weight of a filler selected from wood flour or a solid polyol.

6. The lignin-containing composition according to claim 5, wherein the filler is wood flour.

7. The lignin-containing composition according to claim 1, wherein the lignin is selected from kraft lignin, lignin obtained by at least partially neutralising kraft black liquor using carbon dioxide in order to precipitate the lignin, sulphite lignin, soda lignin, organosolv lignin, lignin from cellulosic ethanol production, or mixtures thereof.

8. The lignin-containing composition according to claim 1, wherein the lignin is a non-derivatised lignin.

9. The lignin-containing composition according to claim 1, wherein the liquid C2-C4 polyol is selected from ethylene glycol, propylene glycol, 1,3-butanediol, 1,4-butanediol, glycerol, or combinations thereof.

10. The lignin-containing composition according to claim 1, wherein the acrylic resin comprises a monomer selected from methyl acrylate, ethyl acrylate, butyl acrylate, 2-chloroethyl vinyl ether, 2-ethylhexyl acrylate, trimethylolpropane triacrylate, acrylonitrile, methacrylate, butyl methacrylate, hydroxyethyl methacrylate, or combinations thereof.

11. A sealant and/or coating composition comprising the composition of claim 1.

12. A process for forming a sealed joint comprising the steps of:
   i. providing a joint, wherein the joint comprises an area where two substrates are mechanically or adhesively joined, and/or said joint comprises an area where one substrate abuts another substrate, wherein each of said substrates is independently selected from metal, plastic, glass, wood, stone, clay or ceramic; and
   ii. applying the lignin-containing composition according to claim 1 to said joint and heating the applied composition at a predetermined temperature for a predetermined time.

13. The process according to claim 12, wherein the predetermined temperature is 100 to 120° C. and wherein the predetermined time is 10 to 50 minutes.

14. The process according to claim 12, wherein the joint is between two metal substrates.

15. A process for forming a coated surface comprising the steps of applying the lignin-containing composition according to claim 1 to a surface of a substrate and heating the applied composition at a predetermined temperature for a predetermined time, wherein the substrate is selected from metal, plastic, glass, wood, stone, clay or ceramic.

16. The process according to claim 15, wherein the predetermined temperature is 100 to 120° C., and wherein the predetermined time is 10 to 50 minutes.

17. The process according to claim 15, wherein the surface of the substrate is a surface of a metal substrate.

* * * * *